United States Patent
Liu et al.

(10) Patent No.: US 10,050,853 B2
(45) Date of Patent: Aug. 14, 2018

(54) NEURAL NETWORK LEARNING METHODS TO IDENTIFY NETWORK PORTS RESPONSIBLE FOR PACKET LOSS OR DELAY

(71) Applicant: FUJITSU LIMITED, Kawasaki-Shi, Kanagawa OT (JP)

(72) Inventors: Xi Liu, Richardson, TX (US); Max Simmons, Richardson, TX (US); Calvin Wan, Richardson, TX (US); Jacky Kuo, Richardson, TX (US); Vamseedhar Reddyvariraja, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 15/247,385

(22) Filed: Aug. 25, 2016

(65) Prior Publication Data
US 2018/0062958 A1    Mar. 1, 2018

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/24 | (2006.01) |

(52) U.S. Cl.
CPC .......... H04L 43/08 (2013.01); H04L 41/0677 (2013.01); H04L 41/145 (2013.01)

(58) Field of Classification Search
CPC ..... H04L 43/50; H04L 12/2697; H04L 40/00; H04L 12/2602; H04J 3/14
See application file for complete search history.

(56) References Cited

U.S. PATENT DOCUMENTS

| | | | | | |
|---|---|---|---|---|---|
| 5,995,485 | A | * | 11/1999 | Croslin | H04M 3/2254 370/216 |
| 6,075,766 | A | * | 6/2000 | Croslin | H04L 41/0663 370/225 |
| 6,331,983 | B1 | * | 12/2001 | Haggerty | H04L 12/185 370/400 |
| 6,813,634 | B1 | * | 11/2004 | Ahmed | H04L 43/0817 709/202 |
| 7,152,179 | B1 | * | 12/2006 | Critchfield | H04L 12/56 714/4.11 |
| 7,570,579 | B2 | * | 8/2009 | Oran | H04L 12/2854 370/216 |
| 2004/0107382 | A1 | * | 6/2004 | Doverspike | H04L 41/0663 714/4.1 |
| 2008/0232347 | A1 | * | 9/2008 | Chao | H04L 45/00 370/351 |

* cited by examiner

Primary Examiner — Steve D Agosta
(74) Attorney, Agent, or Firm — Baker Botts L.L.P.

(57) ABSTRACT

A computational method and system for identifying bad ports in a network may use a neural network learning function based on available network path data that is already collected. In this manner, bad ports in the network may be identified without having to measure each individual port using sensors.

18 Claims, 5 Drawing Sheets

NEURAL NETWORK LEARNING METHODS TO IDENTIFY NETWORK PORTS RESPONSIBLE FOR PACKET LOSS OR DELAY

BACKGROUND

Field of the Disclosure

The present disclosure relates to communication networks, and more specifically, to neural network learning methods to identify network ports responsible for packet loss or delay.

Description of the Related Art

A communication network may include network elements that route packets through the network. Some network elements may include a distributed architecture, wherein packet processing may be distributed among several sub-systems of the network element (e.g., line cards). Thus, network elements may be modular and may include various sub-systems and sub-elements, which may include a shelf, a slot, a port, a channel, or various combinations thereof.

In particular, a network element can be abstracted as a generalized network node having ports that provide input and output paths to other ports on other nodes. Any communications network can, in turn, be represented using the node/port abstraction to make the large number of ports in the network visible.

Because the typical communications network comprises a large number of ports, the performance of each network port may be determinative for the performance and operation of network paths in the network. When the performance of a port is physically degraded, the port may exhibit packet loss or packet delay for all network paths passing through the port, which is undesirable. Therefore, the actual performance of individual ports in a communications network is an important factor in operating a communications network.

BRIEF DESCRIPTION OF THE DRAWINGS

For a more complete understanding of the present invention and its features and advantages, reference is now made to the following description, taken in conjunction with the accompanying drawings, in which.

SUMMARY

Figure 1:
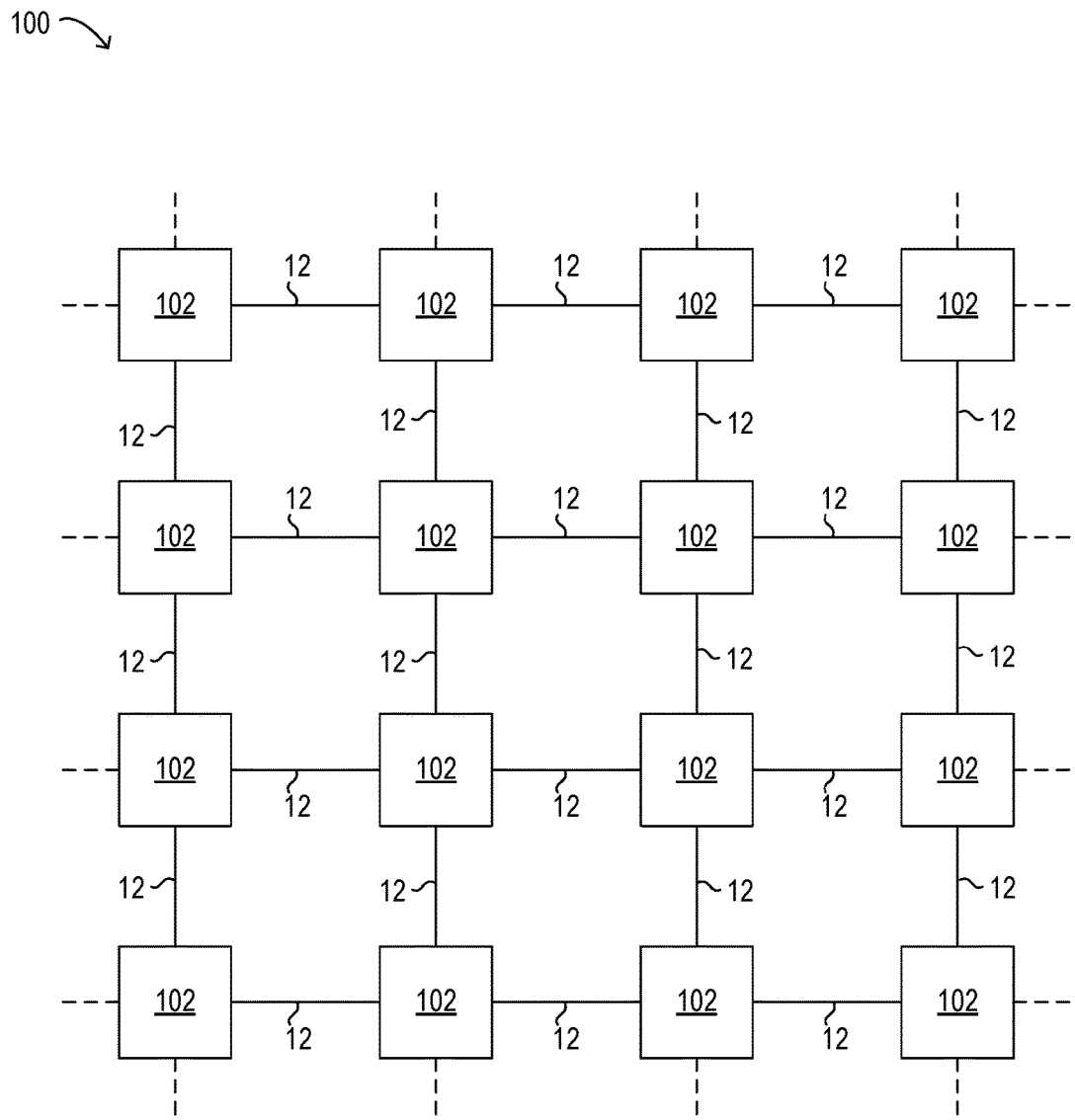
FIG. 1 is a block diagram of selected elements of an embodiment of a network.

In one aspect, a method for identifying network ports responsible for packet loss or delay is disclosed. The method may include modeling a network in terms of edge nodes, core nodes, ports, links, and paths. In the method, edge nodes are connected to external entities and to one core node, each link connects to two nodes, the nodes comprising edge nodes or core nodes, each link connects to a node using a port at the node, and each path begins and ends at an edge node. The method may further include, for a network path, defining a set x as $\{x_1, x_2, x_3 \ldots, x_N\}$ for N number of total ports in the network, where $x_i=1$ when the network path passes through port i, otherwise $x_i=0$ when the network path does not pass through port i. The method may also include, for the network path, defining a binary value function $f(x)$ indicating whether a bad port criterion is satisfied for the network path, where $f(x)=1$ when the bad port criterion is satisfied, and $f(x)=0$ when the bad port criterion is not satisfied. The method may still further include applying an iterative procedure to determine a neural network function $\hat{f}(x)$ for every $f(x)$ corresponding to a plurality of network paths in the network, the neural network function $\hat{f}(x)$ given by $\hat{f}(x)=o[\Sigma_{i=0}^{N} w_i x_i]$. In the method, $w_i$ is a weight factor for each $x_i$, and o is a general step function given by $$o(z) = \begin{cases} 0 & z \leq 0 \\ 1 & z > 0 \end{cases}.$$

The method may further include, upon convergence of the weight factors $w_i$ using the iterative procedure, determining $f(x)$ based on $\hat{f}(x)$ to identify ports in the network satisfying the bad port criteria as bad ports, and sending a service notification to a network administrator of the network, the service notification indicating the bad ports.

In any of the disclosed embodiments of the method, applying the iterative procedure may further include determining the weight factors $w_i$ using the iterative procedure with previous weight factors $w_i$ and next weight factors $w_i$, according to the equation w(next)=w(previous)−η*x*e(x). In the method, w is the set of weight factors $w_i$ over N, η is a positive learning rate (η>0), and e(x) is a function given by $e(x)=\hat{f}(x)-f(x)$.

In any of the disclosed embodiments of the method, for a first iteration, w(previous) includes randomly selected values, and for i=0, $x_o$ is defined as a bias term.

In any of the disclosed embodiments, the method may further include using the iterative procedure with a training set having a known output to determine w, the set of weight factors $w_i$ over N, where the iterative procedure converges on the set w, and the known output comprises the binary value function $f(x)$.

In any of the disclosed embodiments, the method may further include, after convergence of the iterative procedure on the set w, selecting a set x* corresponding to a first network path in the network for which the binary value function $f(x^*)$ is unknown, determining the neural network function $\hat{f}(x^*)$ based on the set w, and determining the binary value function $f(x^*)$ based on the neural network function $\hat{f}(x^*)$. Based on $f(x^*)$, the method may include identifying ports in the first network path satisfying the bad port criteria.

In any of the disclosed embodiments of the method, the bad port criterion may be whether a port exhibits packet loss or does not exhibit packet loss.

In any of the disclosed embodiments of the method, the bad port criterion may be whether a port exhibits a delay greater than a threshold delay or does not exhibit the delay.

In any of the disclosed embodiments of the method, defining the set x may further include receiving port information from a routing module, the port information indicative of individual ports at nodes in the network. The method may also include receiving path information from a path computation engine for the network, the path information indicative of nodes and ports through which the paths propagate through the network, and generating the set x based on the port information and the path information.

In any of the disclosed embodiments, the method may further include, sending an alarm message to each one of the bad ports.

Additional disclosed aspects for neural network learning methods to identify bad ports include a system comprising a processor configured to access non-transitory computer readable memory media, and an article of manufacture comprising non-transitory computer readable memory media storing processor-executable instructions.

DESCRIPTION OF PARTICULAR EMBODIMENTS

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget 12-1 refers to an instance of a widget class, which may be referred to collectively as widgets 12 and any one of which may be referred to generically as a widget 12.

As noted above, when the performance of a network port is physically degraded, the network port may exhibit packet loss or packet delay for all network paths passing through the network port, which is undesirable. Therefore, monitoring the performance of individual network ports in a network may be an important aspect in keeping networks operating at optimum performance.

Typically, the performance of network ports can be monitored using physical sensors, such as a pass-through device on each port, or another type of sensor. However, because of the large numbers of network ports in many communication networks, numbering in the thousands or more, using physical sensors to monitor each individual port is not economically feasible because of the resource usage involved, including the sensors, software, and manpower. Thus, physical monitoring of each individual network port is not economically scalable and, therefore, is not desirable.

As will be disclosed in further detail herein, neural network learning methods may be used to identify network ports responsible for packet loss or delay, also referred to herein as "bad ports". The neural network learning methods to identify bad ports disclosed herein may rely upon neural network learning algorithms to iteratively analyze existing data for individual network paths passing through a plurality of ports in the network. Because more than one network path may pass through each individual port, the existing data, such as latency information, collected at terminal nodes of each network path may be processed to identify individual ports exhibiting packet loss or delay.

Turning now to the drawings, FIG. 1 is a block diagram showing selected elements of an embodiment of network 100. In certain embodiments, network 100 may be an Ethernet network. Network 100 may include one or more transmission media 12 operable to transport one or more signals communicated by components of network 100. The components of network 100, coupled together by transmission media 12, may include a plurality of network elements 102. In the illustrated network 100, each network element 102 is coupled to four other nodes. However, any suitable configuration of any suitable number of network elements 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 100 may communicate information or "traffic" over transmission media 12. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation, as will be described in further detail herein, network elements 102 may comprise network ports for coupling to other network elements 102. Network ports in network elements 102 responsible for packet loss or delay in network 100 may be identified using the neural network learning methods described herein.

Figure 2:
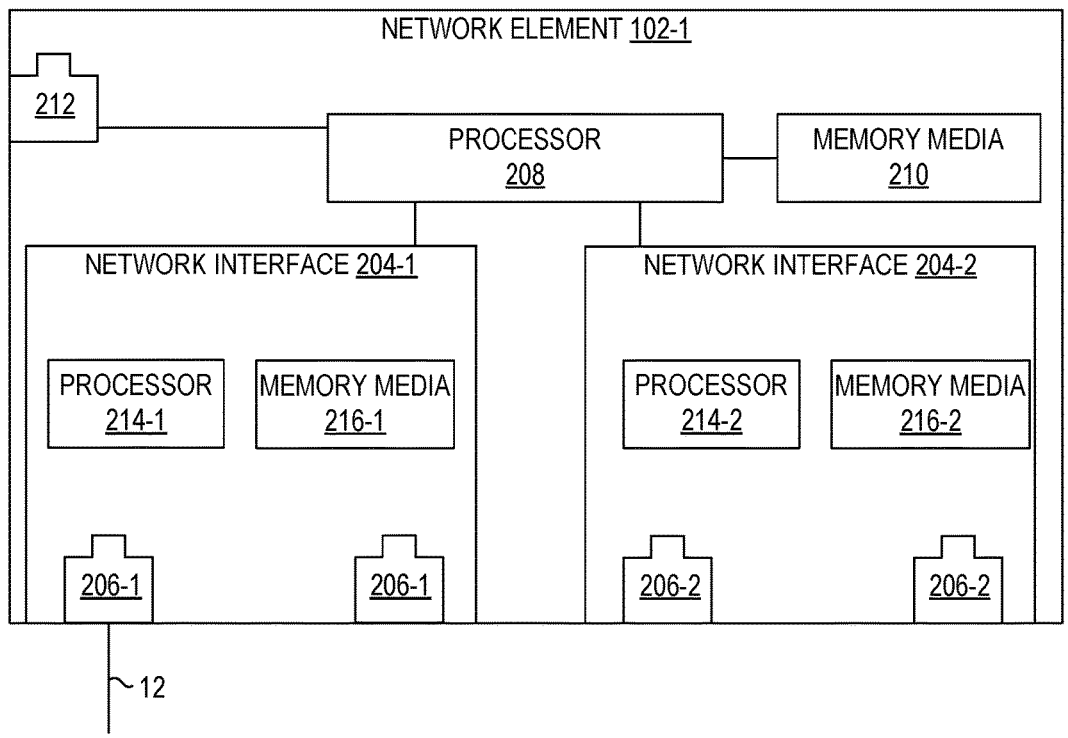
FIG. 2 is a block diagram of selected elements of an embodiment of a network element.

Referring now to FIG. 2, a block diagram of selected elements of an embodiment of network element 102-1, which is represented as a particular embodiment of network elements 102 for descriptive purposes, is illustrated. Network element 102-1, as shown, includes processor 208 and memory media 210, and external port 212, along with network interface 204-1 having ports 206-1 and network interface 204-2 having ports 206-2. External port 212 may be used by processor 208 to communicate with neighbor network elements (see FIG. 1).

As depicted in FIG. 2, each network element 102 may include processor 208 and memory media 210 that may store instructions executable by processor 208. Processor 208 may include a single processing unit (e.g., a core) or may include multiple processing units (not shown). In certain embodiments, processor 208 may represent a multi-processor subsystem in which each individual processor includes one or more processing units. The individual processors or processing units may provide processing resources, such as a processing frequency, messaging, instruction queuing, memory caching, virtual memory, among others, to process instructions and code. As shown, memory media 210 may represent volatile, non-volatile, fixed, or removable media, and may be implemented using magnetic or semiconductor memory. Memory media 210 is capable of storing instructions (i.e., code executable by processor 208) and data. Memory media 210, or at least a portion of contents of memory media 210, may be implemented as an article of manufacture comprising non-transitory computer readable memory media storing processor-executable instructions. Memory media 210 may store instructions including an operating system (OS), which may be any of a variety of operating systems, such as a UNIX variant, LINUX, a Microsoft Windows® operating system, or a different operating system.

In FIG. 2, network elements 102 are shown including at least one network interface 204, which provides a plurality of ports 206 that receive a corresponding transmission media 12 (see also FIG. 1). Ports 206 and transmission media 12 may represent galvanic or optical network connections. Each network interface 204 may include any suitable system, apparatus, or device configured to serve as an interface between a network element 102 and transmission medium 12. Each network interface 204 may enable its associated network element 102 to communicate with other network elements 102 using any of a variety of transmission protocols and standards. Network interface 204 and its various components may be implemented using hardware, software, or any combination thereof. In certain embodiments, network interfaces 204 may include a network interface card. In various embodiments, network interfaces 204 may include a line card. Each port 206 may include a system, device or apparatus configured to serve as a physical interface between corresponding transmission medium 12 and network interface 204. In some embodiments, port 206 may comprise an Ethernet port. Although in FIG. 2 network interfaces 204 are shown with 2 instances of ports 206 for descriptive clarity, in different embodiments, network interfaces 204 may be equipped with different numbers of ports 206 (e.g., 4, 6, 8, 16 ports, etc.).

As shown in FIG. 2, network interfaces 204 may include respective processors 214 and memory media 216, which may store and execute instructions and may be implemented in a similar manner as described above with respect to processor 208 and memory media 210, respectively. In various embodiments, processors 214 may execute internal instructions and operations, such as for packet routing and forwarding, and may be under control or supervision of processor 208. Furthermore, processor 208 and processor(s) 214, along with various internal and external network ports included in network element 102, may represent at least one local domain that is configured at network element 102. In some embodiments, the local domains include at least one virtual local area network (VLAN) domain.

In various embodiments, network element 102 may be configured to receive data and route such data to a particular network interface 204 and port 206 based on analyzing the contents of the data or based on a characteristic of a signal carrying the data (e.g., a wavelength or modulation of the signal). In certain embodiments, network element 102 may include a switching element (not shown) that may include a switch fabric (SWF).

Figure 3:
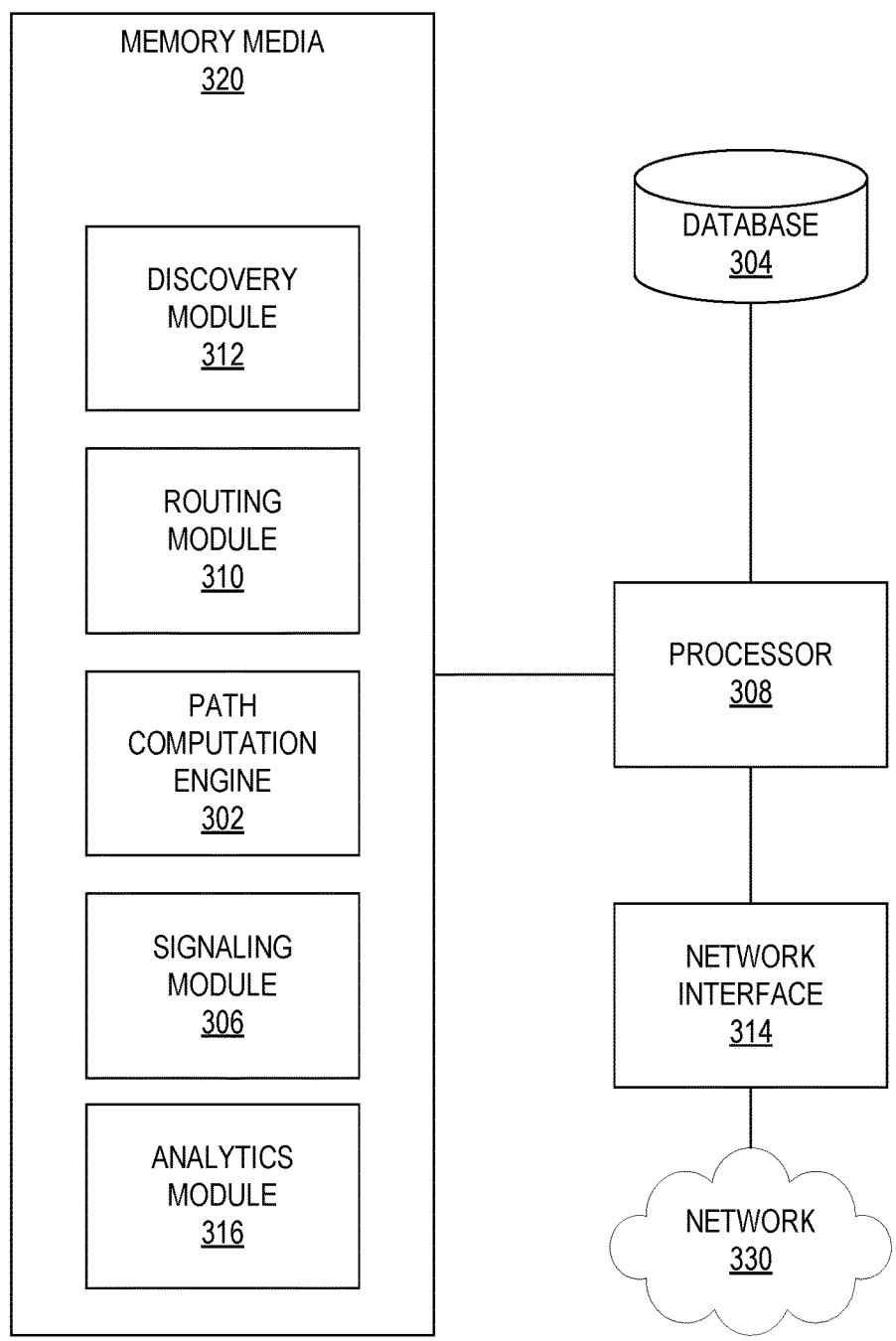
FIG. 3 is a block diagram of selected elements of a control plane.

Referring now to FIG. 3 a block diagram of selected elements of an embodiment of network management system 300 for implementing control plane functionality in networks, such as, for example, in network 100 (see FIG. 1), is illustrated. A control plane includes functionality for network intelligence and control and comprises applications that support the ability to establish network services, including applications or modules for discovery, routing, path computation, and signaling, as will be described in further detail. The control plane applications executed by network management system 300 work together to automatically establish services within network 100, which may be at least in part an optical network. Discovery module 312 discovers local links connecting to neighbors. Routing module 310 broadcasts local link information to network nodes while populating database 304. When a request for service from network 100 is received, path computation engine 302 may be called to compute a network path using database 304. This network path may then be provided to signaling module 306 to establish the requested service. An analytics module 316 may perform various analyses on network data, such as network data collected by control plane 300 and stored using database 304, among other network data.

As shown in FIG. 3, network management system 300 includes processor 308 and memory media 320, which store executable instructions (i.e., executable code) executable by processor 308, which has access to memory media 320. Processor 308 may execute instructions that cause network management system 300 to perform the functions and operations described herein. For the purposes of this disclosure, memory media 320 may include non-transitory computer-readable media that stores data and/or instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media; or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, routing module 310, and analytics module 316. In some embodiments, analytics module 316, in conjunction with path computation engine 302, signaling module 306, discovery module 312, and routing module 310, may represent instructions or code for implementing various algorithms according to the present disclosure.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of network 100. In certain embodiments, network 330 may include at least certain portions of a public network, such as the Internet. Network 330 may be implemented using hardware, software, or various combinations thereof.

In certain embodiments, network management system 300 may be configured to interface with a person (i.e., a user) and receive data about the signal transmission path. For example, network management system 300 may also include and/or may be coupled to one or more input devices or output devices to facilitate receiving data about the signal transmission path from the user and outputting results to the user. The one or more input and output devices (not shown) may include, but are not limited to, a keyboard, a mouse, a touchpad, a microphone, a display, a touchscreen display, an audio speaker, or the like. Alternately or additionally, network management system 300 may be configured to receive data about the signal transmission path from a device such as another computing device or a network element (not shown in FIG. 3).

As shown in FIG. 3, in some embodiments, discovery module 312 may be configured to receive data concerning a signal transmission path in a network and may be responsible for discovery of neighbors and links between neighbors. In other words, discovery module 312 may send discovery messages according to a discovery protocol, and may receive data about the signal transmission path. In some embodiments, discovery module 312 may determine features, such as, but not limited to, media type; media length; number and type of components; data rate; modulation format of the data; input power of an optical signal; number of optical signal carrying wavelengths (i.e., channels); channel spacing; traffic demand; and network topology, among others.

As shown in FIG. 3, routing module 310 may be responsible for propagating link connectivity information to various nodes within a network, such as network 100. In particular embodiments, routing module 310 may populate database 304 with resource information to support traffic engineering, which may include link bandwidth availability. Accordingly, database 304 may be populated by routing module 310 with information usable to determine a network topology of a network.

Path computation engine 302 may be configured to use the information provided by routing module 310 to database 304 to determine transmission characteristics of the signal transmission path. The transmission characteristics of the signal transmission path may provide insight on how transmission degradation factors may affect the signal transmission path. When the network is an optical network, the transmission degradation factors may include, for example: chromatic dispersion (CD), nonlinear (NL) effects, polarization effects, such as polarization mode dispersion (PMD) and polarization dependent loss (PDL), amplified spontaneous emission (ASE) and/or others, which may affect optical signals within an optical signal transmission path. To determine the transmission characteristics of the signal transmission path, path computation engine 302 may consider the interplay between various transmission degradation factors. In various embodiments, path computation engine 302 may generate values for specific transmission degradation factors. Path computation engine 302 may further store data describing the signal transmission path in database 304.

In FIG. 3, signaling module 306 may provide functionality associated with setting up, modifying, and tearing down end-to-end networks services in network 100. For example, when an ingress node in the optical network receives a service request, network management system 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In FIG. 3, analytics module 316 may provide functionality to access various network information and to execute analytical algorithms for various purposes and directed to different stakeholders. For example, analytics module 316 may perform neural network learning methods to identify network ports responsible for packet loss or delay, as disclosed herein. It is noted that in some embodiments, analytics module 316 may execute on a generic computer system represented by processor 308 and memory media 320 in FIG. 3. Any generic computer system may execute analytics module 316 without executing any one or more of discovery module 312, routing module 310, path computation engine 302, and signaling module 316. In particular embodiments, analytics module 316 may be executed on a generic computer executing a software-defined networking (SDN) controller (not shown).

Figure 4:
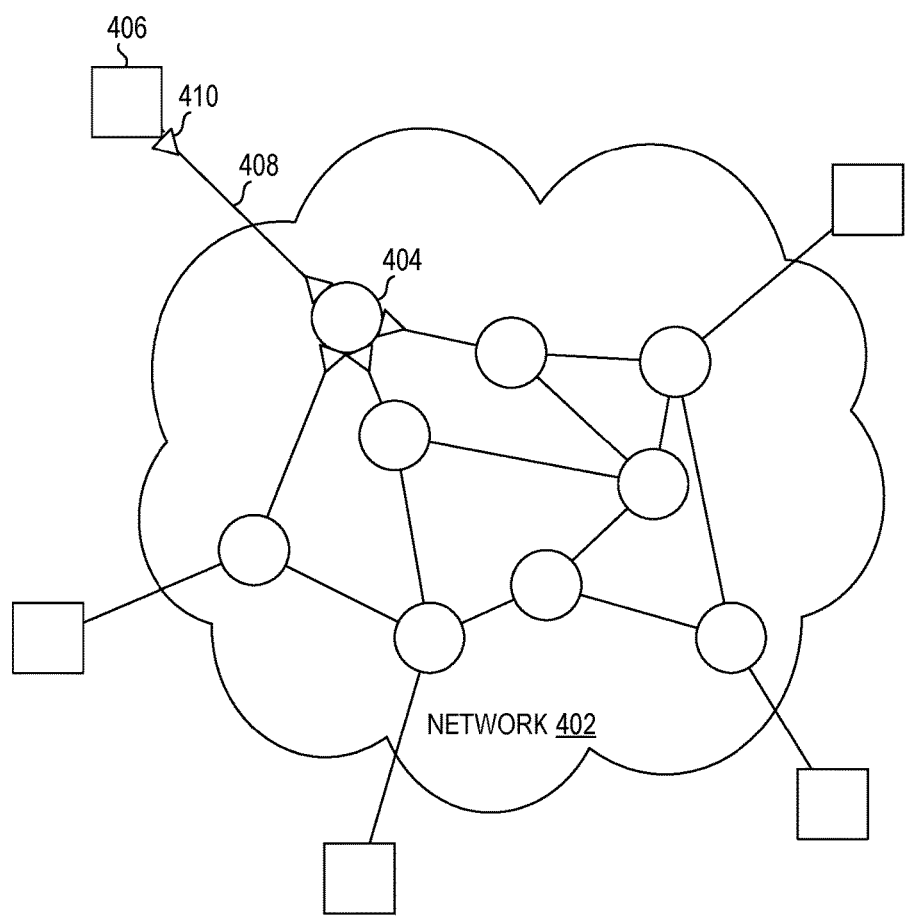
FIG. 4 is a block diagram of selected elements of a network model.

Referring now to FIG. 4, a block diagram of selected elements of an embodiment of a network model 400 is illustrated. Network model 400 shows how nodes 404, 406, ports 410, and links 408 may be modeled to perform neural network learning methods to identify network ports responsible for packet loss or delay, as disclosed herein. Network model 400 may represent an embodiment of network 100 (see FIG. 1). Network 402 may represent a core network in network model 400.

In general, a communications network may be modeled using edge nodes 406 (shown as squares in FIG. 4) and core nodes 404 (shown as circles in FIG. 4) connected by network links 408. At each intersection of link 408 with either edge node 406 or core node 408, it may be assumed that an individual network port 410 is present and dedicated to the intersection. Certain network ports 410 are shown as triangles for edge node 406, link 408, and core node 404 in FIG. 4 for descriptive clarity, but it will be understood that each core node 404 and edge node 406 have a port 410 at the intersection of link 408 to the node. In other words, each of edge nodes 406 and core nodes 404 may be comprised of ports 410 that are available for interconnection with network links 408. In network model 400, edge nodes 406 and core nodes 404 may have other ports (unpopulated ports) in addition to ports 410 populated by network links 408.

Edge nodes 406, which are at the boundary of network model 400, may be connected to customer equipment or to other networks, which are not shown in FIG. 4. As used herein, a "network path" begins on a first edge node 406 that is a source node and ends on a second edge node 406 that is a destination node. In some embodiments, the source node and the destination node for a network path may be the same nodes.

Core nodes 404, which are shown in network 402, may represent internal nodes where no customer equipment is connected. As used herein, core nodes 404 are not source nodes or destination nodes (i.e., terminal nodes) for a network path.

In FIG. 4, a network path (not shown) may be defined in network model 400 as any path beginning and ending on edge nodes 406. Thus, as is evident from network model 400, numerous different network paths may be defined from any one of edge nodes 406 to any other edge node 406, and passing through different numbers of core nodes 404. At each edge node 406, the network path may use one port 410, an output port for edge node 406 at the source of the network path, or an input port for edge node 406 at the destination of the network path. Additionally, each core node 404 through which a network path passes may use two ports 410 for the network path, an input port and an output port. Furthermore, multiple network paths may include a given core node 404 and may accordingly pass through the same port.

Based on the above characteristics of network model 400, neural network learning methods to identify network ports responsible for packet loss or delay are described below in further detail. Based on the fact that packet loss or delay is recorded for each network path at edge nodes 406 for the network path, the recorded information can be used to determine which individual ports 410 are bad ports.

Using network model 400, let x define a set $\{x_1, x_2, x_3, \ldots, x_N\}$ for N number of total ports in network model 400 for each network path, where $x_i=1$ when the network path passes through port i, otherwise $x_i=0$ when the network path does not pass through port i. It is noted that, in some embodiments, port information indicative of individual ports at nodes in the network may be received from routing module 310, while path information indicative of nodes and ports through which the paths propagate through the network may be received path computation engine 302. Then, the set x may be generated based on the port information and the path information received for a plurality of network paths.

Furthermore, let $f(x)$ define a binary value function of x for each network path indicating whether packet loss or delay is measured for that network path, such that $f(x)=1$ when packet loss or delay occurs along the network path, and $f(x)=0$ when no packet loss or delay occurs along the network path. It is noted that other conditions for $f(x)$ may be used to modify the problem being solved (bad ports) into a binary condition. For example, to solve for a particular delay value, the binary condition for $f(x)$ might be defined as $f(x)=1$ when a delay >50 ms is observed, else $f(x)=0$. It will be understood that 50 ms is an arbitrary threshold delay value, and that other threshold delay values may be used.

Then, a mapping relationship may be obtained by learning the dataset $\{(x, f(x))\}$ for all optical paths. For example, if it is determined that $f(x)=x_1 \vee x_3 \vee x_5$ (where "$\vee$" is the OR operator), then a network path modeled using network model 400 experiences packet loss/delay if and only if the network path passes through ports 1, 3, and 5; ergo ports 1, 3, and 5 may be identified as bad ports.

Specifically, Equation 1 defines a neural network function with a weight factor $w_i$ for each $x_i$.

$$\hat{f}(x)=o[\Sigma_{i=0}^{N} w_i x_i] \quad \text{Equation (1)}$$

In Equation 1:
$w_i$ is a weight factor for each $x_i$; and
o is a general step function given by $$o(z) = \begin{cases} 0 & z \leq 0 \\ 1 & z > 0 \end{cases}.$$

In Equation 1, for i=0, $x_o$ may be defined as a bias term. Furthermore, the weight factors $w_i$ may be determined by iteration using Equation 2.

$$\text{Equation }w(\text{next})=w(\text{previous})-\eta*x*e(x) \quad (2)$$

In Equation 2:
w is the set of weight factors over N;
$\eta$ is a positive learning rate ($\eta>0$); and
e(x) is a function given by $e(x)=\hat{f}(x)-f(x)$.

For example, for the initial iteration, the weight factors $w_i$ may be populated with random numbers. Then, Equation 2 is used to update values for the weight factors $w_i$ for each next iteration based on the values from the previous iteration. The iteration may be performed a certain number of times, or may be performed until the values for the weight factors $w_i$ converge (i.e., no longer change with iteration). Because the function $f(x)$ can be represented using OR operators, the function $f(x)$ is linear separable and will converge such that every $f(x)$ can be represented by $\hat{f}(x)$.

In application of neural network learning methods to identify bad network ports, a training set with known inputs and outputs may be initially used to first determine the weight factors $w_i$. Then, once the weight factors $w_i$ are known, given any new set $x^*$, $f(x^*)$ can be estimated using $\hat{f}(x^*)$.

In a first example of using and validating a training set, let N=7 and let a first path $x^1=\{1, 0, 1, 1, 0, 0, 1\}$ have $f(x^1)=0$, and let a second path $x^2=\{0, 1, 0, 1, 0, 0, 1\}$ have $f(x^2)=1$. Furthermore, let the bias value $x_0=-0.3$ and $\eta=0.2$, and assume initial values w(previous)=$\{1, 0.5, 0.5, 0.5, 0.5, 0.5, 0.5, 0.5\}$. Then, the neural network learning method may be applied to a next iteration of $\hat{f}(x^1)$ to train the values for the weight factors $w_i$, as shown in Equation 3.

$$\hat{f}(x^1)=o(1*-0.3+0.5*1+0.5*0+0.5*1+0.5*1+0.5*0+0.5*0+0.5*1)=o(1.7)=1 \quad \text{Equation (3)}$$

Then, for a next iteration for the first path, $e(x^1)=\hat{f}(x^1)-\hat{f}(x^1)=1-0=1$. Applying Equation 2 yields the next iterative values in the first example as w(new)=$\{1.06, 0.8, 0.5, 0.3, 0.3, 0.5, 0.5, 0.3\}$. Then, the w(new) values may be validated using the second path, as shown in Equation 4.

$$\hat{f}(x^2)=o(1.06*-0.3+0.8*0+0.5*1+0.3*0+0.3*1+0.5*0+0.5*0+0.3*1)=o(0.782)=1 \quad \text{Equation (4)}$$

Then, for a next iteration for the second path, $e(x^2)=\hat{f}(x^2)-f(x^2)=1-1=0$, which results in no change in the weight factors $w_i$, or convergence. Although the above procedure in the first example has been shown for N=7 and for two network paths, it will be understood that the same methods are applicable for any value of N and may be repeated for any number of network paths until convergence is attained.

In a second example, after a training set, as shown above in the first example, has been iterated, then for every x there exists $\hat{f}(x)=f(x)$, and the set w is known. Based on Equation 1, given any new set $x^*$, $\hat{f}(x^*)$ can be used to estimate $f(x^*)$. In the second example, the set $x^*$ can be used to mask individual ports and determine which ports are bad ports, where $x^{1*}=\{1, 0, 0, 0, 0, 0, 0\}$;
$x^{2*}=\{0, 1, 0, 0, 0, 0, 0\}$;
$x^{3*}=\{0, 0, 1, 0, 0, 0, 0\}$;
$x^{4*}=\{0, 0, 0, 1, 0, 0, 0\}$;
$x^{5*}=\{0, 0, 0, 0, 1, 0, 0\}$;
$x^{6*}=\{0, 0, 0, 0, 0, 1, 0\}$; and
$x^{7*}=\{0, 0, 0, 0, 0, 0, 1\}$.

Suppose that the results for $\hat{f}(x^*)$ are: $\hat{f}(x^{1*})=1$; $\hat{f}(x^{2*})=0$; $\hat{f}(x^{3*})=1$; $\hat{f}(x^{4*})=0$; $\hat{f}(x^{5*})=1$; $\hat{f}(x^{6*})=0$; and $\hat{f}(x^{7*})=1$, then it may be determined that $f(x)=x_1 \vee x_3 \vee x_5 \vee x_7$, and the bad ports have been identified as ports 1, 3, 5, and 7. Although the above procedure in the second example has been shown for N=7, it will be understood that the same methods are applicable for any value of N and may be easily scaled to networks with large or very large numbers of ports, nodes, and network paths.

The neural network learning method described above may be evaluated using various performance metrics. An 'accuracy' may be defined as a proportion of identified bad ports from all actual bad ports. A 'relevancy' may be defined as a proportion of validated bad ports from the identified bad ports. For example, if there are actually 5 bad ports in a network, and 4 of the 5 actual bad ports are identified, then the accuracy is 4/5 or 80%. If another two identified bad ports are determined not to be bad ports, the relevancy is 4/6 or 67%.

Various simulations have been performed to validate the neural network learning methods to identify network ports responsible for packet loss or delay described herein. For example, in a network model having 20 nodes, 96 ports, 10% core nodes of all nodes, and 5 bad ports, 100% accuracy may be attained after analyzing about 300 randomly chosen network paths among all possible network paths. With 13 bad ports, ~100% accuracy may be attained after analyzing about 2,000 randomly chosen network paths. The simulation results demonstrate the viability and desirability of the neural network learning methods to identify network ports responsible for packet loss or delay described herein.

The neural network learning methods to identify network ports responsible for packet loss or delay described herein may provide a fast and efficient method for identifying bad ports that does not rely upon measurement using sensors at each port and relies on existing and available data. The neural network learning methods to identify network ports responsible for packet loss or delay described herein may enable network operators to quickly and reliably identify bad ports and may reduce or eliminate resources used in trying to diagnose or find bad ports. The neural network learning methods to identify network ports responsible for packet loss or delay described herein may provide a computationally tractable method that can be economically implemented and scaled to any desired network complexity or size.

Figure 5:
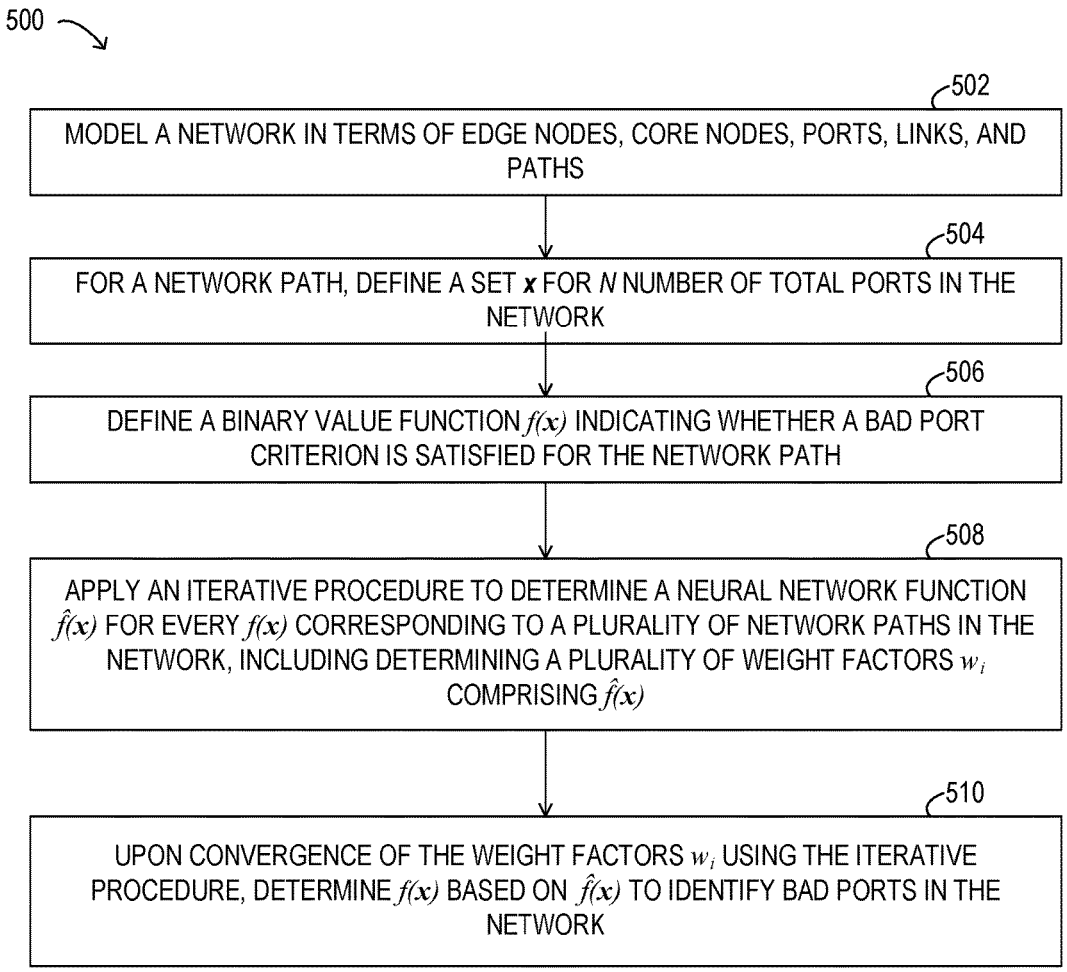
FIG. 5 is a flow chart depicting selected elements of an embodiment of a method for neural network learning methods to identify bad ports.

Turning now to FIG. 5, a block diagram of selected elements of an embodiment of a method 500 for neural network learning methods to identify bad ports, as described herein. Method 500 may be performed using network element 102 (see FIGS. 1 and 2). In various embodiments, method 500 may be executed by analytics module 316 (see FIG. 3). It is noted that certain operations described in method 500 may be optional or may be rearranged in different embodiments.

In FIG. 5, method 500 may begin at step 502 by modeling a network in terms of edge nodes, core nodes, ports, links, and paths. In step 502, the modeling may specify that: edge nodes are connected to external entities and to one core node; each link connects to two nodes, the nodes comprising edge nodes or core nodes; each link connects to a node using a port at the node; and each path begins at a first edge node and ends at a second edge node different from the first edge node. At step 504, for a network path, the set x is defined for N number of total ports in the network. At step 506, a binary value function $f(x)$ is defined indicating whether a bad port criterion is satisfied for the network path. At step 508, an iterative procedure is applied to determine a neural network function $\hat{f}(x)$ for every $f(x)$ corresponding to a plurality of network paths in the network, including determining a plurality of weight factors $w_i$ comprising $\hat{f}(x)$. At step 510, upon convergence of the weight factors $w_i$ using the iterative procedure, $f(x)$ based on $\hat{f}(x)$ is determined to identify bad ports in the network. In some embodiments, after the bad ports are identified, action may be taken in the network to remediate the bad ports. For this purpose, a service notification indicating the bad ports may subsequently be sent to a network administrator of the network, who may initiate further action in the network. In some embodiments, an alarm message may be sent to each of the bad ports, which may generate an alarm at the corresponding node where each bad port is located indicating that service of the bad ports should be performed.

As disclosed herein, a computational method and system for identifying bad ports in a network may use a neural network learning function based on available network path data that is already collected. In this manner, bad ports in the network may be identified without having to measure each individual port using sensors.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for identifying network ports responsible for packet loss or delay, the method comprising:
    modeling a network in terms of edge nodes, core nodes, ports, links, and paths wherein:
        edge nodes are connected to external entities and to one core node;
        each link connects to two nodes, the nodes comprising edge nodes or core nodes;
        each link connects to a node using a port at the node; and
        each path begins and ends at an edge node;
    for a network path, defining a set x as $\{x_1, x_2, x_3 \ldots, x_N\}$ for N number of total ports in the network, wherein $x_i=1$ when the network path passes through port i, otherwise $x_i=0$ when the network path does not pass through port i;
    for the network path, defining a binary value function $f(x)$ indicating whether a bad port criterion is satisfied for the network path, wherein $f(x)=1$ when the bad port criterion is satisfied, and $f(x)=0$ when the bad port criterion is not satisfied; and
    applying an iterative procedure to determine a neural network function $\hat{f}(x)$ for every $f(x)$ corresponding to a plurality of network paths in the network, the neural network function $\hat{f}(x)$ given by $$\hat{f}(x) = o\left[\sum_{i=0}^{N} w_i x_i\right]$$

wherein $w_i$ is a weight factor for each $x_i$, and o is a general step function given by $$o(z) = \begin{cases} 0 & z \leq 0 \\ 1 & z > 0 \end{cases};$$

upon convergence of the weight factors $w_i$ using the iterative procedure, determining $f(x)$ based on $\hat{f}(x)$ to identify ports in the network satisfying the bad port criteria as bad ports; and sending a service notification to a network administrator of the network, the service notification indicating the bad ports.

2. The method of claim 1, wherein applying the iterative procedure further comprises:

determining the weight factors $w_i$ using the iterative procedure with previous weight factors $w_i$ and next weight factors $w_i$, according to the equation $$w(\text{next}) = w(\text{previous}) - \eta * x * e(x)$$

wherein w is the set of weight factors $w_i$ over N, $\eta$ is a positive learning rate ($\eta>0$), and $e(x)$ is a function given by $e(x) = \hat{f}(x) - f(x)$.

3. The method of claim 2, wherein for a first iteration, w(previous) includes randomly selected values, and for i=0, $x_o$ is defined as a bias term.

4. The method of claim 3, further comprising:

using the iterative procedure with a training set having a known output to determine w, the set of weight factors $w_i$ over N, wherein the iterative procedure converges on the set w, and wherein the known output comprises the binary value function $f(x)$.

5. The method of claim 4, further comprising:

after convergence of the iterative procedure on the set w, selecting a set x* corresponding to a first network path in the network for which the binary value function $f(x*)$ is unknown;

determining the neural network function $\hat{f}(x*)$ based on the set w; and determining the binary value function $f(x*)$ based on the neural network function $\hat{f}(x*)$; and based on $f(x*)$, identifying ports in the first network path satisfying the bad port criteria.

6. The method of claim 1, wherein the bad port criterion is whether a port exhibits packet loss or does not exhibit packet loss.

7. The method of claim 1, wherein the bad port criterion is whether a port exhibits a delay greater than a threshold delay or does not exhibit the delay.

8. The method of claim 1, wherein defining the set x further comprises:

receiving port information from a routing module, the port information indicative of individual ports at nodes in the network;

receiving path information from a path computation engine for the network, the path information indicative of nodes and ports through which the paths propagate through the network; and generating the set x based on the port information and the path information.

9. The method of claim 1, further comprising:

sending an alarm message to each one of the bad ports.

10. A system comprising a processor configured to access non-transitory computer readable memory media storing instructions executable by the processor for:

modeling a network in terms of edge nodes, core nodes, ports, links, and paths wherein:

edge nodes are connected to external entities and to one core node;

each link connects to two nodes, the nodes comprising edge nodes or core nodes;

each link connects to a node using a port at the node; and each path begins and ends at an edge node;

for a network path, defining a set x as $\{x_1, x_2, x_3 \ldots, x_N\}$ for N number of total ports in the network, wherein $x_i=1$ when the network path passes through port i, otherwise $x_i=0$ when the network path does not pass through port i;

for the network path, defining a binary value function $f(x)$ indicating whether a bad port criterion is satisfied for the network path, wherein $f(x)=1$ when the bad port criterion is satisfied, and $f(x)=0$ when the bad port criterion is not satisfied; and applying an iterative procedure to determine a neural network function $\hat{f}(x)$ for every $f(x)$ corresponding to a plurality of network paths in the network, the neural network function $\hat{f}(x)$ given by $$\hat{f}(x) = o\left[\sum_{i=0}^{N} w_i x_i\right]$$

wherein $w_i$ is a weight factor for each $x_i$, and o is a general step function given by $$o(z) = \begin{cases} 0 & z \leq 0 \\ 1 & z > 0 \end{cases};$$

upon convergence of the weight factors $w_i$ using the iterative procedure, determining $f(x)$ based on $\hat{f}(x)$ to identify ports in the network satisfying the bad port criteria as bad ports; and sending a service notification to a network administrator of the network, the service notification indicating the bad ports.

11. The system of claim 10, wherein applying the iterative procedure further comprises:

determining the weight factors $w_i$ using the iterative procedure with previous weight factors $w_i$ and next weight factors $w_i$, according to the equation $$w(\text{next}) = w(\text{previous}) - \eta * x * e(x)$$

wherein w is the set of weight factors $w_i$ over N, $\eta$ is a positive learning rate ($\eta>0$), and $e(x)$ is a function given by $e(x) = \hat{f}(x) - f(x)$.

12. The system of claim 11, wherein for a first iteration, w(previous) includes randomly selected values, and for i=0, $x_o$ is defined as a bias term.

13. The system of claim 12, further comprising instructions for:

using the iterative procedure with a training set having a known output to determine w, the set of weight factors $w_i$ over N, wherein the iterative procedure converges on the set w, and wherein the known output comprises the binary value function $f(x)$.

14. The system of claim 13, further comprising instructions for:

after convergence of the iterative procedure on the set w, selecting a set x* corresponding to a first network path in the network for which the binary value function $f(x*)$ is unknown;

determining the neural network function $\hat{f}(x*)$ based on the set w; and determining the binary value function $f(x*)$ based on the neural network function $\hat{f}(x*)$; and based on $f(x^*)$, identifying ports in the first network path satisfying the bad port criteria.

15. The system of claim 10, wherein the bad port criterion is whether a port exhibits packet loss or does not exhibit packet loss.

16. The system of claim 10, wherein the bad port criterion is whether a port exhibits a delay greater than a threshold delay or does not exhibit the delay.

17. The system of claim 10, wherein the instructions for defining the set x further comprise instructions for:
   receiving port information from a routing module, the port information indicative of individual ports at nodes in the network;
   receiving path information from a path computation engine for the network, the path information indicative of nodes and ports through which the paths propagate through the network; and
   generating the set x based on the port information and the path information.

18. The system of claim 10, further comprising instructions for:
   sending an alarm message to each one of the bad ports.

* * * * *